(12) United States Patent
Seita

(10) Patent No.: US 7,758,258 B2
(45) Date of Patent: Jul. 20, 2010

(54) IMAGE-PICKUP APPARATUS

(75) Inventor: Masato Seita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 11/972,298

(22) Filed: Jan. 10, 2008

(65) Prior Publication Data

US 2008/0175583 A1 Jul. 24, 2008

(30) Foreign Application Priority Data

Jan. 23, 2007 (JP) ............................. 2007-013129

(51) Int. Cl.
*G03B 9/00* (2006.01)
*G03B 9/02* (2006.01)
*G03B 9/08* (2006.01)
*G03B 9/40* (2006.01)
*G03B 19/10* (2006.01)
*G03B 1/04* (2006.01)
*G11B 15/34* (2006.01)

(52) U.S. Cl. ........................ 396/357; 396/358; 396/452; 396/460; 396/484; 396/510; 242/356

(58) Field of Classification Search .................. 396/357
See application file for complete search history.

(56) References Cited

U.S. PATENT DOCUMENTS

| 4,458,998 A | 7/1984 | Tanaka et al. ............... 396/355 |
| 4,500,185 A * | 2/1985 | Haraguchi et al. .......... 396/391 |
| 5,327,185 A * | 7/1994 | Nakagawa .................. 396/460 |
| 7,384,204 B2 * | 6/2008 | Uematsu et al. ............. 396/358 |

FOREIGN PATENT DOCUMENTS

| CN | 1525741 A | 9/2004 |
| CN | 1690832 A | 11/2005 |
| JP | 2001-021944 | 1/2001 |
| JP | 2001-042386 | 2/2001 |
| JP | 2003-005254 | 1/2003 |

OTHER PUBLICATIONS

The above references were cited in a May 8, 2009 Chinese Office Action that issued in Chinese Patent Application No. 200810004703. 6, which is enclosed with English Translation.

* cited by examiner

*Primary Examiner*—Melissa J Koval
(74) *Attorney, Agent, or Firm*—Cowan, Liebowitz & Latman, P.C.

(57) ABSTRACT

An image-pickup apparatus includes a mirror moving into and out of an optical path, a shutter mechanism including shutter blades and a shutter-driving spring driving the shutter blades in an open direction, a charge-holding member holding the shutter mechanism with the shutter-driving spring charged, and a hold-releasing member releasing the holding of the shutter mechanism by the charge-holding member. The shutter blades and the charge-holding member are moved in a plane parallel to a light-receiving surface of an image-pickup element. The hold-releasing member is moved in a plane orthogonal to the light-receiving surface of the image-pickup element and drives the mirror in a moving-out direction when releasing the holding of the shutter mechanism. The apparatus has a small configuration associated with driving the shutter mechanism and is appropriate for providing a cleaning mechanism of the image-pickup element by using a movable member different from the shutter blades.

8 Claims, 10 Drawing Sheets

IMAGE-PICKUP APPARATUS

BACKGROUND OF THE INVENTION

The present invention relates to an image-pickup apparatus such as a single-lens reflex camera including a shutter mechanism.

Some single-lens reflex digital cameras electrically control the charge accumulation time of an image-pickup element and employ a mechanical shutter to prevent unnecessary light from entering the image-pickup element (see Japanese Patent Laid-Open No. 2001-42386). The mechanical shutter in this case has shutter blades corresponding to a front curtain or a rear curtain of a typical focal-plane shutter.

Before image pickup, the shutter blades are closed to prevent unnecessary light from entering the image-pickup element. The shutter blades are opened in accordance with a release operation and an operation for so-called live-view display, for example. The shutter blades are again closed after image pickup. In such a mechanical shutter, the shutter blades are driven by a driving force from a spring, similarly to a typical focal-plane shutter. Thus, after image pickup, it is necessary to charge the spring in preparation for next image pickup.

Japanese Patent Laid-Open No. 2001-21944 has disclosed a focal-plane shutter called a double-light-shielding type. The shutter disclosed in Japanese Patent Laid-Open No. 2001-21944 is also called a direct-holding type. Specifically, a rear-curtain driving member for driving a rear curtain is held by an electromagnet in early stages of image-pickup operation, and when a charge lever (set member) is returned to the initial position, engagement of a rear-curtain operating member coupled to the rear curtain is released to open an aperture of the shutter. An electric current applied to the electromagnet is shut off in predetermined timing to drive the rear-curtain driving member biased by a charged spring together with the rear curtain, thereby shielding the aperture.

A single-lens reflex camera using an interchangeable lens has a problem of dust adhering to a surface of an image-pickup element to have an adverse effect in which the dust is taken in a picked-up image. To address this, Japanese Patent Application 2003-5254 has proposed a camera including a member (brush) attached to a shutter blade for cleaning a light-receiving surface of the image-pickup element.

The shutter disclosed in Japanese Patent Laid-Open No. 2001-42386 has only one pair of shutter blades, but it has a complicated structure and it is difficult to reduce the size.

It is possible to realize similar operations to those of the shutter mechanism in Japanese Patent Application 2001-42386 with a relatively simple configuration by using the rear-curtain driving mechanism in the focal-plane shutter disclosed in Japanese Patent Laid-Open No. 2001-21944.

When the configuration for cleaning dust adhering to the light-receiving surface of the image-pickup element is included in the shutter by providing the brush for the shutter blades as disclosed in Japanese Patent Application No. 2003-5254, the friction between the brush and the image-pickup element may affect shutter operation or reduce durability of the shutter. For this reason, it is preferable to use a movable member different from the shutter blades and to provide a brush on the movable member. However, when such a movable member (cleaning mechanism) is added to the shutter disclosed in Japanese Patent Application 2001-21944, the shutter and the camera on which the shutter is mounted are increased in size.

BRIEF SUMMARY OF THE INVENTION

The present invention provides an image-pickup apparatus that has a small shutter mechanism and a small configuration associated with driving thereof and is appropriate for providing a cleaning mechanism of an image-pickup element by using a movable member different from shutter blades.

According to an aspect, the present invention provides an image-pickup apparatus including a mirror that is moved into and out of an optical path from an image-pickup optical system to an image-pickup element, a shutter mechanism that includes shutter blades and a shutter-driving spring driving the shutter blades in an open direction, a charge-holding member that holds the shutter mechanism with the shutter-driving spring charged, and a hold-releasing member that releases the holding of the shutter mechanism by the charge-holding member. The shutter blades and the charge-holding member are moved in a plane parallel to a light-receiving surface of the image-pickup element. The hold-releasing member is moved in a plane orthogonal to the light-receiving surface of the image-pickup element and drives the mirror in a moving-out direction when releasing the holding of the shutter mechanism.

Other aspects of the present invention will be apparent from the embodiments described below with reference to the drawings.

DETAILED DESCRIPTION OF THE PREFERRED EMBODIMENTS

Exemplary embodiments of the present invention will be described below with reference to the accompanied drawings.

Figure 5:
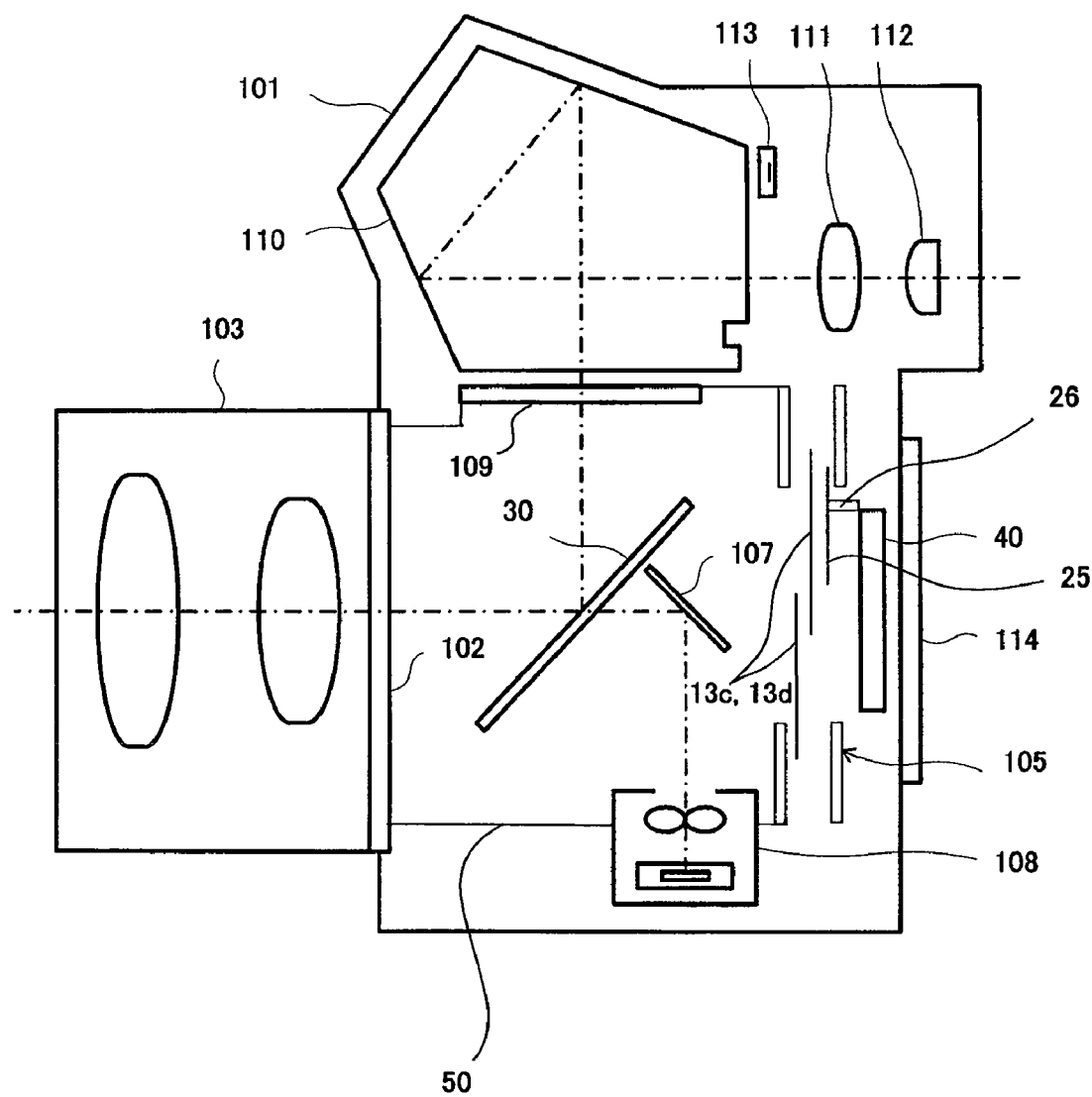
FIG. 5 is a section view showing the configuration of an image-pickup system of the embodiment.

FIG. 5 shows the configuration of a digital single-lens reflex camera as an image-pickup system according to an embodiment of the present invention.

Reference numeral 101 shows a digital single-lens reflex camera (hereinafter referred to simply as a camera) as an image-pickup apparatus. Reference numeral 103 shows an interchangeable lens (lens apparatus) removably mounted on the camera 101. The interchangeable lens 103 is mechanically and electrically connected to a mount 102 provided at a front-end portion of a mirror box 50 in the camera 101. The camera 101 and the interchangeable lens 103 communicate various signals with each other via an interface portion (not shown) provided in the mount 102. The camera 101 supplies power to the interchangeable lens 103 via the interface portion.

An image-pickup optical system formed of a plurality of lens units such as a focus lens and a zoom lens and an aperture-stop unit is housed in the interchangeable lens 103. Although each lens unit is shown as a single lens in FIG. 5, each lens unit is often formed of a plurality of lenses in reality.

Reference numeral 30 shows a main mirror that is formed of a half mirror and is moved into and out of an image-pickup optical path from the interchangeable lens 103 (image-pickup optical system) to an image-pickup element 40, later described. In observation of an object through a viewfinder optical system, later described, the main mirror 30 is placed diagonally in the image-pickup optical path to reflect the light flux from the interchangeable lens 103 toward the viewfinder optical system. For image pickup and live-view display, later described, the main mirror 30 is moved upward out of the image-pickup optical path to direct the light flux from the interchangeable lens 103 toward a shutter 105 and the image-pickup element 104.

The main mirror 30 and a sub mirror 107, later described, are housed in the mirror box 50 integrally coupled to a chassis of the camera 101.

Reference numeral 105 shows the shutter mechanism (hereinafter referred to simply as the shutter) that controls entrance of the light flux from the interchangeable lens 103 to the image-pickup element 40. The shutter 105 has a plurality of (two in the embodiment) shutter blades 13c and 13d. The shutter 105 includes a cleaning mechanism having a cleaning brush 26 attached to a cleaning plate 25. The movement of the shutter blades 13c and 13d is controlled in accordance with a shutter speed set in the camera 101. The detailed configuration of the shutter 105 is later described.

Reference numeral 40 shows the image-pickup element formed of a CCD sensor or a CMOS sensor, for example, which photoelectrically converts an object image formed by the image-pickup optical system.

Reference numeral 107 shows the sub mirror that is rotatable together with the main mirror 30 and reflects the light flux passed through the main mirror 30 placed in the image-pickup optical path toward an AF sensor 108, later described.

The AF sensor 108 is formed of a secondary image-forming lens and a plurality of CCD area sensors, not shown, and detects the focus state of the image-pickup optical system with a phase-difference detection method.

Reference numeral 109 shows a focusing plate disposed on a primary image-forming plane of the image-pickup optical system. A Fresnel lens (collective lens) is formed on an entrance surface of the focusing plate 109. An object image (viewfinder image) is formed on an exit surface thereof.

Reference numeral 110 shows a pentaprism that vertically and horizontally inverses an object image formed on the focusing plate 109 into an erect normal image. Reference numerals 111 and 112 show eye-piece lenses that direct the light flux (viewfinder image) emerging from the pentaprism 110 toward an eye of a user, not shown. The focusing plate 109, the pentaprism 110, and the eyepiece lenses 111 and 112 constitute the viewfinder optical system.

Reference numeral 113 shows an AE sensor that has a photodiode for each of areas separated in an image-pickup screen to measure the luminance of the corresponding area in an object image formed on the emergence surface of the focusing plate 109.

Reference numeral 114 shows a display unit that serves as a display element for displaying a still image, an moving image (video), or various image-pickup information taken with the image-pickup element 40 and is formed of a liquid crystal display element or a self-light-emitting element, for example. The display unit 114 is placed on the back of the camera 101.

The configuration and operation of the shutter 105 of the embodiment will be described with reference to FIGS. 1, 2, and 3A to 3C.

Figure 1:
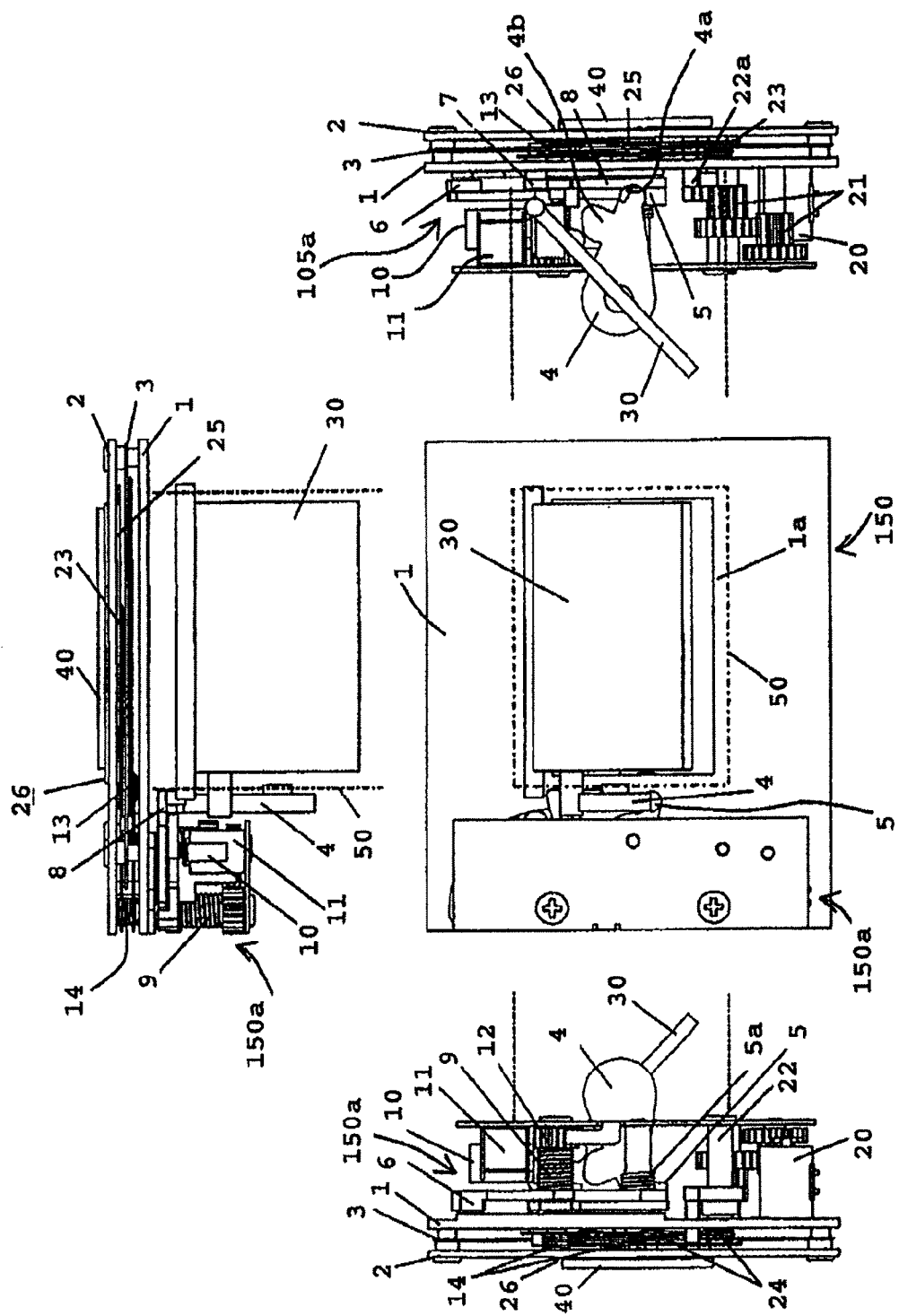
FIG. 1 shows a plan view, side views from left and right, and a top view showing a shutter before image pickup, which is mounted on a camera that is an embodiment of the present invention.

FIG. 1 shows a front view showing the shutter 105 and the main mirror 30 before image pickup from an object side, side views on left and right and a top view of the shutter 105 and the main mirror 30. FIG. 3A is a perspective view showing the shutter 105 before image pickup. The sub mirror 107 shown in FIG. 5 is omitted in FIGS. 1, and 3A, and further in FIGS. 2, 3B, and 3C.

The main mirror 30 is placed at an angle of 45 degrees with respect to the optical axis from the image-pickup optical system to the image-pickup element 40 (hereinafter referred to as a 45-degree position). An aperture 1a formed in a shutter base plate 1 is shielded by the shutter blades 13 (13c and 13d).

A driving mechanism 105a for driving the shutter blades 13 is provided on an object-side surface of the shutter base plate 1 to the left of the aperture 1a. The driving mechanism 105a has a blade lever 7 serving as a shutter-driving member coupled to the shutter blades 13 to drive them and a driving lever 6 serving as a return-driving member for driving the blade lever 7 in a close direction. The blade lever 7 and the driving lever 6 are held rotatably on the shutter base plate 1 and are rotatable about the same axis.

In addition to the shutter blades 13, the driving lever 6, the blade lever 7, a charge lever 5 and a latching lever 8, later described, are moved (or rotated) in a plane parallel to a light-receiving surface (surface closer to the object) of the image-pickup element 40. The parallel plane includes not only a precisely parallel plane but also a plane not in parallel precisely within tolerance of manufacturing errors.

As shown in the left side view of FIG. 1, a blade-driving spring 9 formed of a torsion coil spring serving as returning coil is hung on the driving lever 6. The spring force thereof biases the driving lever 6 in a direction of an arrow E shown in FIG. 3A. The biasing force of the blade-driving spring 9 can be adjusted by a ratchet gear mechanism 12.

The driving lever 6 is rotated to a position where the blade-driving spring 9 is charged by a cam portion (not shown) formed on the charge lever 5 serving as a returning-spring charging member and is held at that position. At the position, an armature (not shown) provided for the driving lever 6 is in contact with a yoke 10 forming an electromagnet together with a coil 11. In this state, an electric current is not applied to the electromagnet (coil 11) to save power.

A set lever 4 serving as a hold-releasing member is rotatably attached to the side portion of the mirror box 50 shown by a dash dotted line in FIG. 1. In other words, the set lever 4 is rotated in a plane orthogonal to the light-receiving surface of the image-pickup element 40. The orthogonal plane includes not only a precisely orthogonal plane but also a plane not orthogonal precisely within tolerance of manufacturing errors. The set lever 4 holds the charge lever 5 at the position shown in FIG. 1. The charge lever 5 is biased by a charge lever spring 5a shown in FIG. 1 in a direction of an arrow D shown in FIG. 3A.

The embodiment is described in conjunction with the set lever 4 held on the side portion of the mirror box 50, it may be held by a fixing member in the camera 101 or part of the shutter base plate, which is other than the mirror box 50.

The driving mechanism 105a also includes the latching lever (charge-holding member) 8 held on the shutter base plate 1 and rotatable about the same axis as that of the charge lever 5. As shown in FIG. 3A, the latching lever 8 has, at the end thereof, an engaging hook portion 8a that can engage with an engaging hook portion 7a formed at the end of the blade lever 7. The latching lever 8 is biased in a direction B' shown in FIG. 3A, that is, a direction in which it more tightly engages with the blade lever 7 by a spring, not shown.

The blade lever 7 is subjected to a biasing force of a blade-returning spring (shutter-driving spring) 14 shown in FIG. 1. The biasing force acts in a direction F shown in FIG. 3A.

Figure 2:
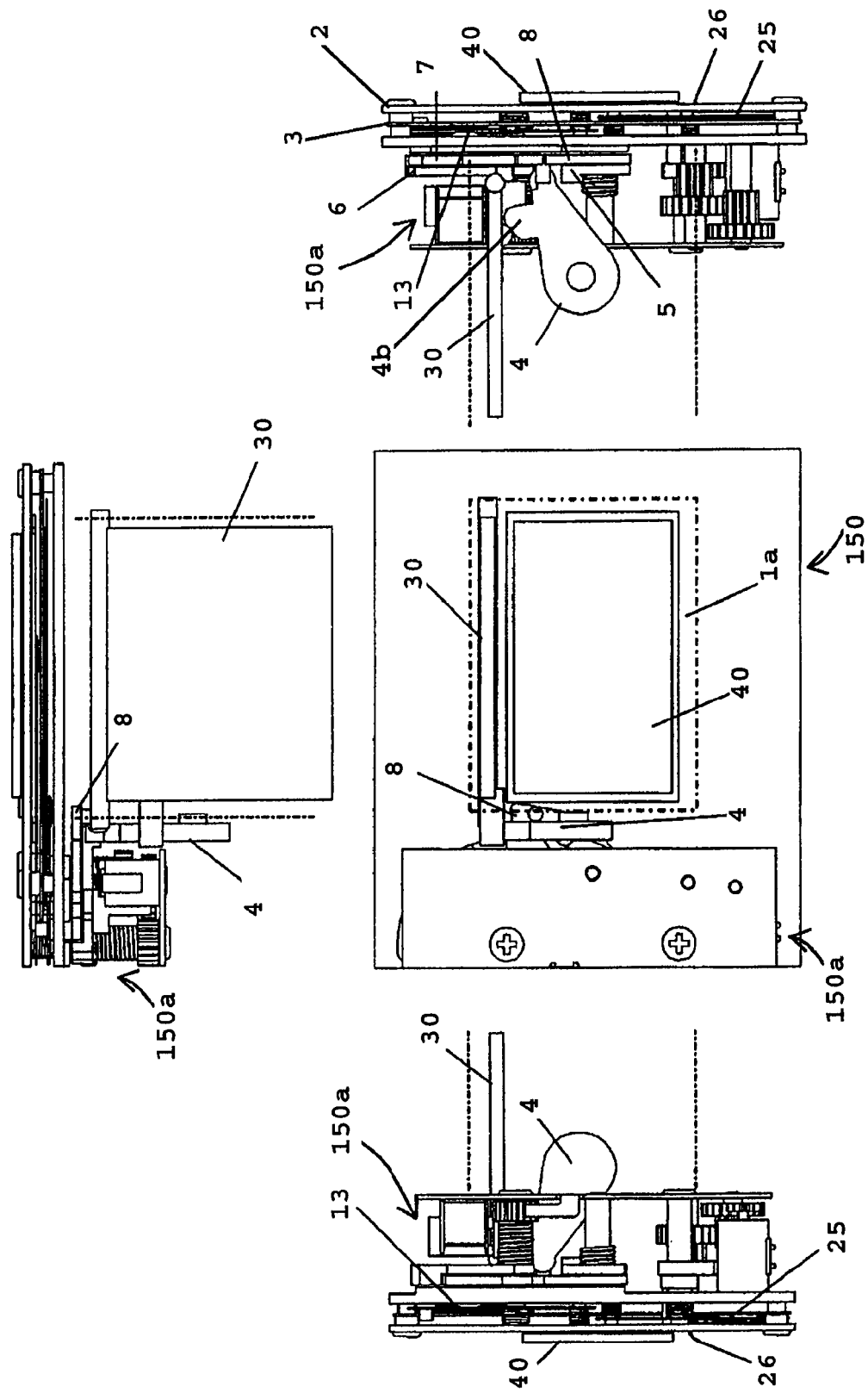
FIG. 2 shows a plan view, side views from left and right, and a top view showing the shutter during image pickup.
Figure 3A:
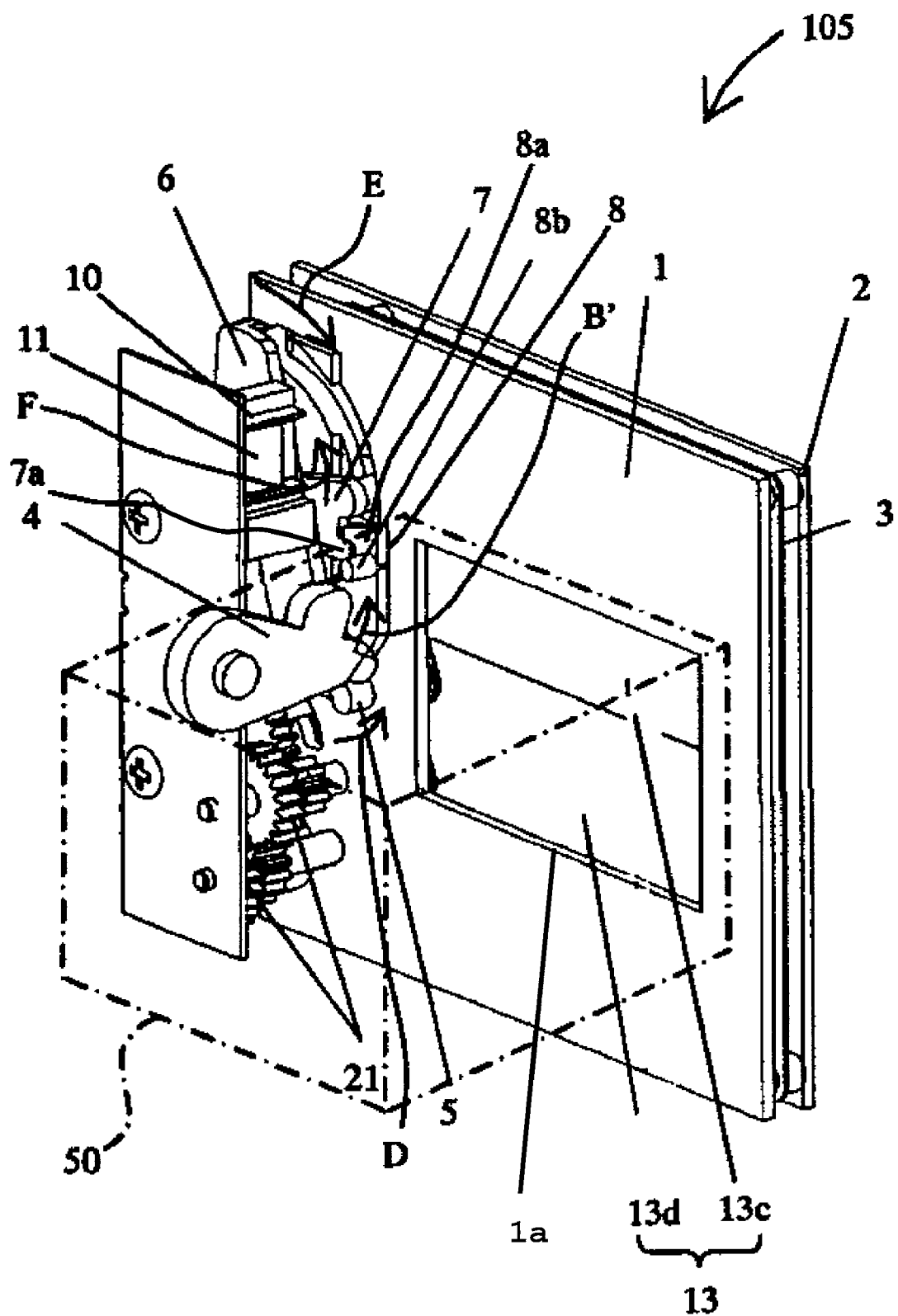
FIG. 3A is a perspective view showing the shutter before image pickup.
Figure 3B:
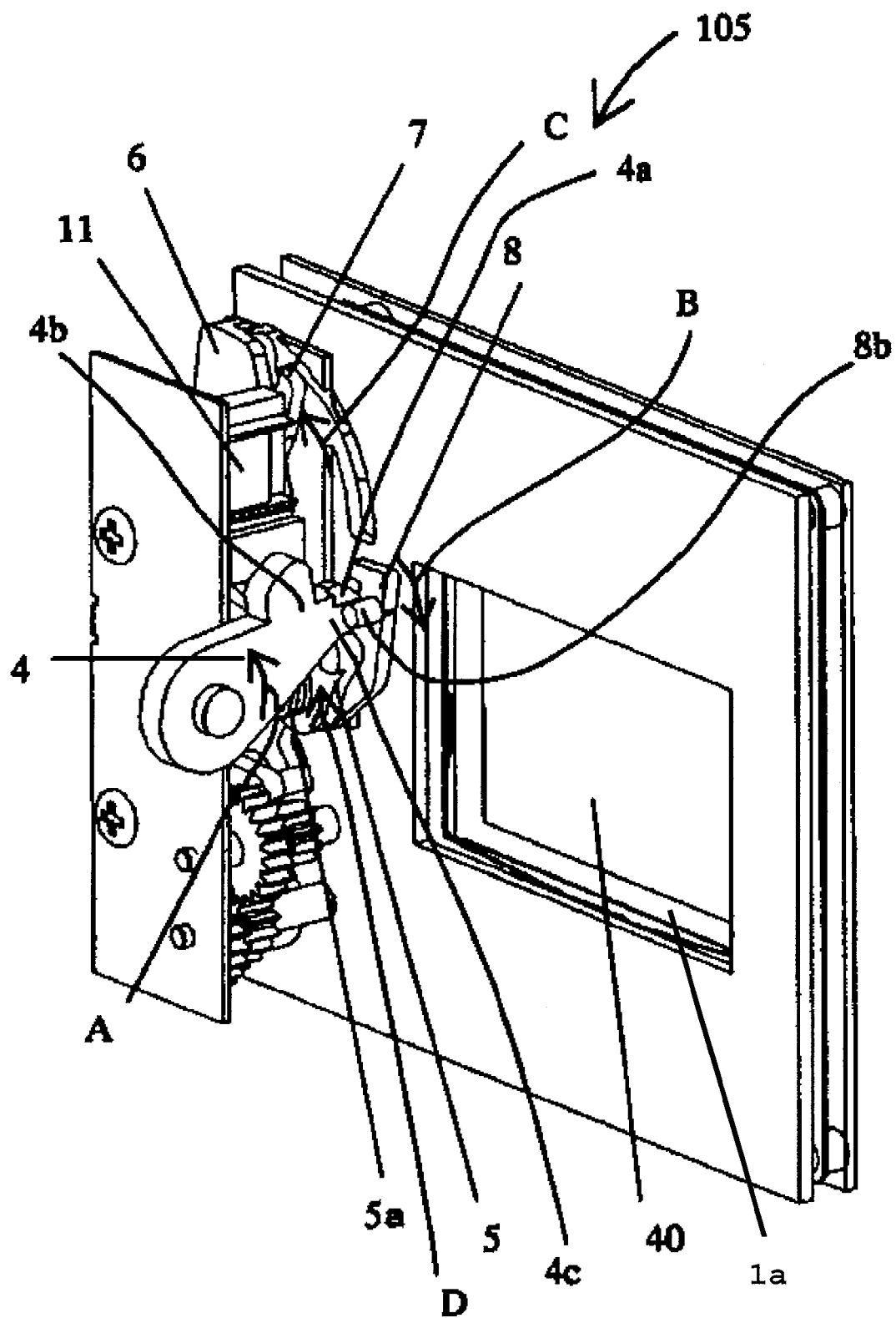
FIG. 3B is a perspective view showing the shutter during image pickup.

FIG. 2 shows a front view showing the shutter 105 and the main mirror 30 during image pickup from the object side, side views on left and right and a top view of the shutter 105 and the main mirror 30. FIG. 3B is a perspective view showing the shutter 105 during image pickup.

When a release switch, not shown, provided on the camera 101 is operated to output a release signal for start of image pickup, the set lever 4 is rotated from the position shown in FIGS. 1 and 3A to the position shown in FIGS. 2 and 3B by a motor or a biasing force of a spring, which are not shown. The rotation direction is shown by an arrow A in FIG. 3B. The set lever 4 drives the main mirror 30 upward by a mirror-driving portion 4b formed on the upper side of an intermediate portion of the set lever 4 to move the main mirror 30 out of the image-pickup optical path.

The set lever 4 presses a pin portion 8b formed on the latching lever 8 in a direction of an arrow B in FIG. 3B by an inclined portion 4a provided at the end of the set lever 4 and a side portion 4c adjacent thereto. This rotates the latching lever 8 in the direction of the arrow B to release the engagement between the engaging hook portion 8a thereof and the engaging hook portion 7a of the blade lever 7. After the engagement and holding of the blade lever 7 by the latching lever 8 are released in this manner, the blade lever 7 is rotated in a direction of an arrow C in FIG. 3B by the biasing force of the blade-returning spring 14, so that the shutter blades 13 are operated to open the aperture 1a. Although the two blade-returning springs 14 are shown in FIG. 1, only one blade-returning spring may be provided.

When the set lever 4 is rotated in the direction of the arrow A, the holding of the charge lever 5 at the position shown in FIGS. 1 and 3A is released. Then, the biasing force of the charge lever spring 5a rotates the charge lever 5 in the direction of the arrow D in FIG. 3B to release the holding of the driving lever 6 by the cam portion of the charge lever 5. In other words, in response to the rotation of the set lever 4 in the direction of the arrow A, the charge lever 5 is moved to retract from the position where it charges the blade-driving spring 9 via the driving lever 6.

Simultaneously with the output of the release signal, an electric current is applied to the coil 11 forming the electromagnet to polarize the yoke 10. Thus, the armature provided on the driving lever 6 is attracted by the yoke 10 and the driving lever 6 is held at the position where the blade-driving spring 9 is charged.

The operation time from the state shown in FIGS. 1 and 3A to the state shown in FIGS. 2 and 3B is referred to as a release time lag. In the embodiment, the shortest possible period is set for the time from the output of the release signal (operation of the release switch) to the movement of the main mirror 30 and the shutter blades 13 out of the image-pickup optical path (aperture 1a). This can reduce the release time lag and shorten the time taken before the start of next image-pickup operation to reduce the probability that the user may miss the timing of image pickup.

The embodiment employs a driving source such as a motor and a strong spring as a means for quickly rotating the set lever 4 to maximize the speed of the retraction of the main mirror 30 and the release of the engagement and holding of the blade lever 7 and the shutter blades 13 by the latching lever 8. The returning spring force of the set lever 4 is set to be greater than the returning spring force of the charge lever 5 to operate the set lever 4 faster than the returning operation of the charge lever 5. Although the charge lever 5 is held by the set lever 4 before image pickup, the levers 5 and 4 are not coupled to each other and thus the rotation speed of the charge lever 5 from the position shown in FIGS. 1 and 3A to the position shown in FIGS. 2 and 3B is determined by the biasing force of the charge lever spring 5a.

Figure 6:
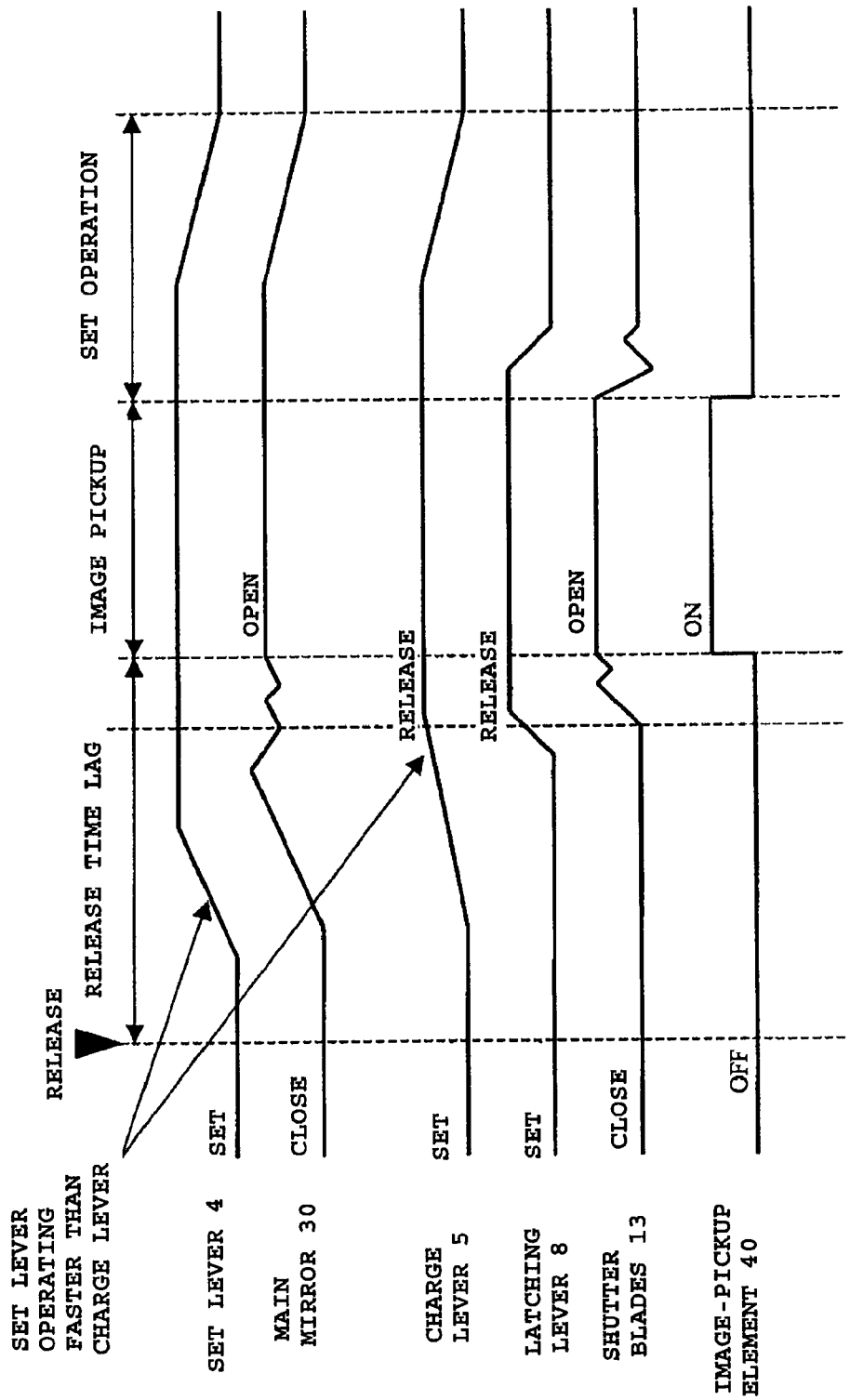
FIG. 6 shows operation timing of the shutter of the embodiment.

FIG. 6 shows the operation timing of the respective components. To reduce the release time lag, not only the set lever 4 but also the charge lever 5 should be rotated as fast as possible. However, quick rotation of the driving lever 6 attracted to the electromagnet and the charge lever 5 in contact with the driving lever 6 through the cam portion may give an impact to the attracting portion of the driving lever 6 (armature) and the electromagnet to release the attraction, resulting in rotation of the driving lever 6. On the other hand, the convergence time of bouncing of the main mirror 30 in its returning operation is the longest and thereby determines the release time lag.

Thus, in the embodiment, an increase in the release time lag is prevented by completing the rotation of the charge lever 5 in the direction of the arrow D and the open operation of the shutter blades 13 by the time the retraction of the main mirror 30 with the set lever 4 and the convergence of bouncing of the main mirror 30 at the retraction position are completed.

In this manner, the main mirror 30 is moved out of the image-pickup optical path and the shutter blades 13 open the aperture 1a to cause the light flux (object image) from the object to enter the image-pickup element 40, and then images can be picked up. In the embodiment, an electronic shutter function of the image-pickup element 40 is used to read out charges therefrom sequentially from the top of the image-pickup element 40.

Figure 3C:
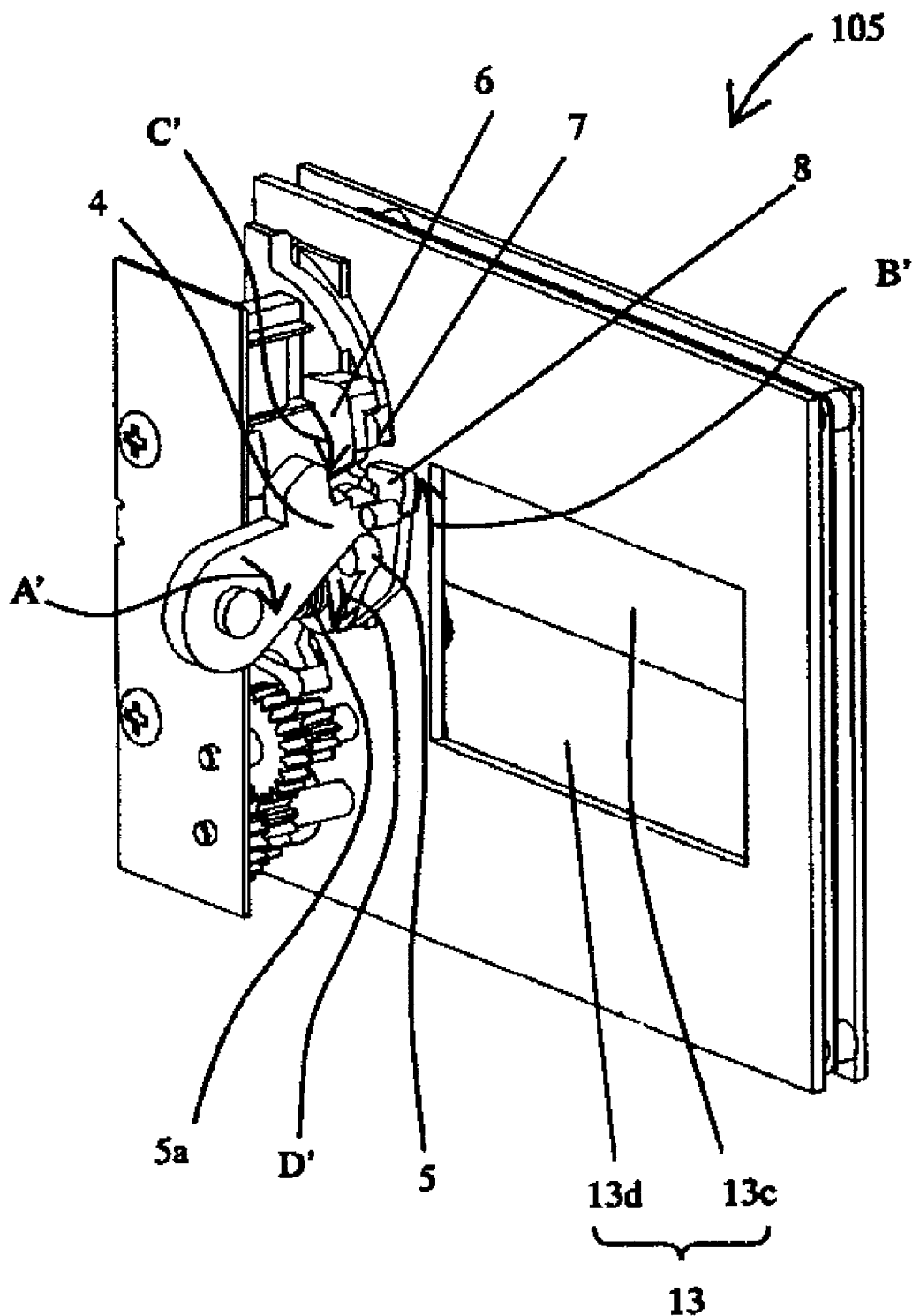
FIG. 3C is a perspective view showing the shutter after the completion of image pickup.

After the lapse of a predetermined time period, the electric current applied to the electromagnet (coil 11) is shut off to release the attraction and holding of the driving lever 6. The driving lever 6 and the blade lever 7 are thereby rotated together in the direction of an arrow C' in FIG. 3C by the biasing force of the driving spring 9 appropriately adjusted with the ratchet gear mechanism 12. This causes the shutter blades 13 to shield the aperture 1a to complete the exposure of the image-pickup element 40. FIG. 3C shows the shutter 105 after the exposure of the image-pickup element 40 is completed.

Then, the set lever 4 is rotated downward (in the direction of an arrow A') by the driving source such as a motor. This returns the main mirror 30 biased by a spring, not shown, to the abovementioned 45-degree position and rotates the charge lever 5 in the direction of an arrow D'. The charge lever 5 rotates the driving lever 6 by the cam portion in the direction of the arrow C' while the driving spring 9 is charged. The downward rotation of the set lever 4 also rotates the latching lever 8 in the direction of an arrow B' with the biasing force of a spring, not shown, to engage the engaging hook portion 8a shown in FIG. 1 with the engaging hook portion 7a of the blade lever 7.

This holds the shutter blades 13 with the aperture 1a shielded. The setting completion state is the same as the state before image pickup shown in FIGS. 1 and 3A. One image-pickup operation is thus ended.

According to the embodiment, the components such as the levers related to the shutter can be placed compactly in the image-pickup apparatus using the pair of shutter blades and the image-pickup element without increasing the release time lag. As a result, even when the cleaning mechanism of the image-pickup element, later described, is disposed in or close to the shutter, it is possible to prevent an increase in size of the shutter and the camera on which the shutter is mounted.

The shutter blades 13 and the driving mechanism thereof will be described with reference to FIG. 4A. In the embodiment, the shutter blades 13 are formed of the two shutter blades 13c and 13d. The shutter blades 13c and 13d constitute a parallel link with two arm members 13a and 13b held rotatably on the shutter base plate 1. The number of the shutter blades 13 is not limited to two, and three or more shutter blades may be provided.

The shutter of the present invention is not limited to the abovementioned configuration but the number or the like of the shutter blades may be arbitrarily set.

Next, the abovementioned image-pickup element cleaning mechanism will be described. As described above, the cleaning mechanism cleans dust adhering to the light-receiving surface of the image-pickup element 40. The surface of the image-pickup element 40 closer to the object is referred to as the light-receiving surface of the image-pickup element including the case where the image-pickup element 40 has an optical filter such as an infrared cut filter and a low pass filter formed thereon.

As shown in the right side view of FIG. 1, the cleaning mechanism has a motor 20 such as a stepping motor, a reduction gear 21, and a cleaning lever 22 coupled to the reduction gear 21 and rotatable. The cleaning mechanism also has cleaning-plate arms 23 coupled to the cleaning lever 22 via a pin 22a formed on the cleaning lever 22, and a cleaning plate 25 coupled to the cleaning-plate arms 23 and serving as a holding member (movable member). The cleaning mechanism also has the cleaning brush 26 fixed to the cleaning plate 25 and serving as a cleaning member.

The cleaning plate 25 and the cleaning brush 26 are placed between the shutter blades 13 and the image-pickup element 40. The movement space of the shutter blades 13 is separated from the movement space of the cleaning plate 25 and the cleaning brush 26 by an intermediate plate 3 to avoid interference between the shutter blades 13 and the cleaning plate 25. A cover plate 2 coupled to the shutter base plate 1 is provided closer to the image-pickup element than the cleaning plate 25. This prevents the cleaning plate 25 from coming out toward the image-pickup element.

FIG. 1 shows the cleaning mechanism immediately before its operation. The cleaning brush 26 is placed above the image-pickup element 40. During standby in which cleaning is not performed by the cleaning mechanism, the cleaning brush 26, the cleaning plate 25, and the cleaning-plate arms 23 are retracted outside the aperture 1a (below the aperture 1a) as shown in FIG. 2.

Figure 4A:
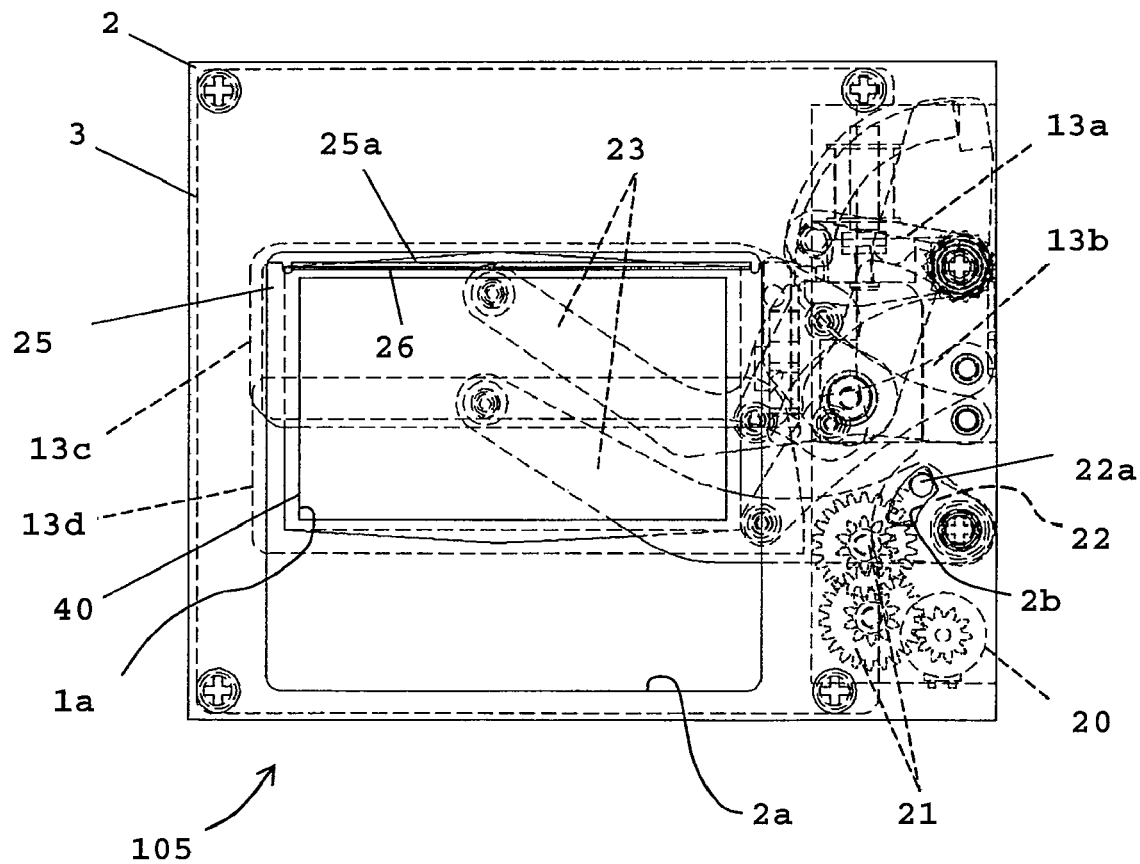
FIG. 4A is a rear view showing the shutter immediately before a cleaning mechanism provided for the shutter cleans an image-pickup element.
Figure 4B:
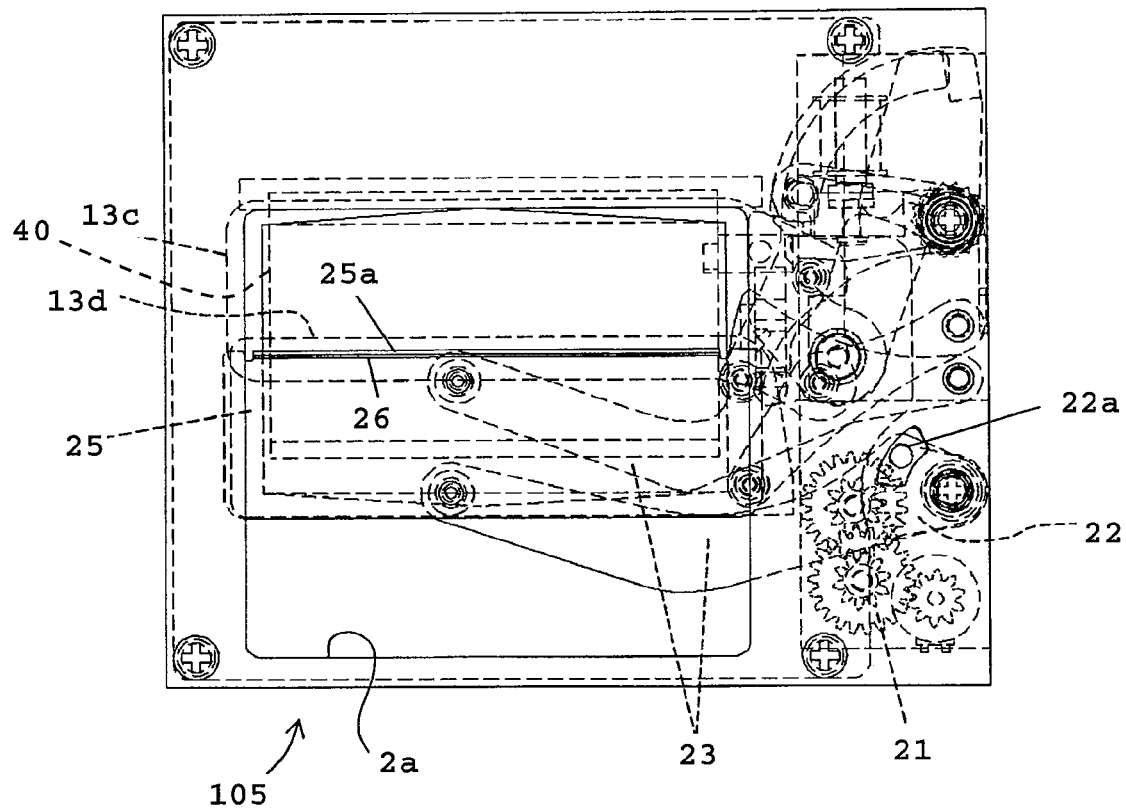
FIG. 4B is a rear view showing the shutter during cleaning of the image-pickup element by the cleaning mechanism.
Figure 4C:
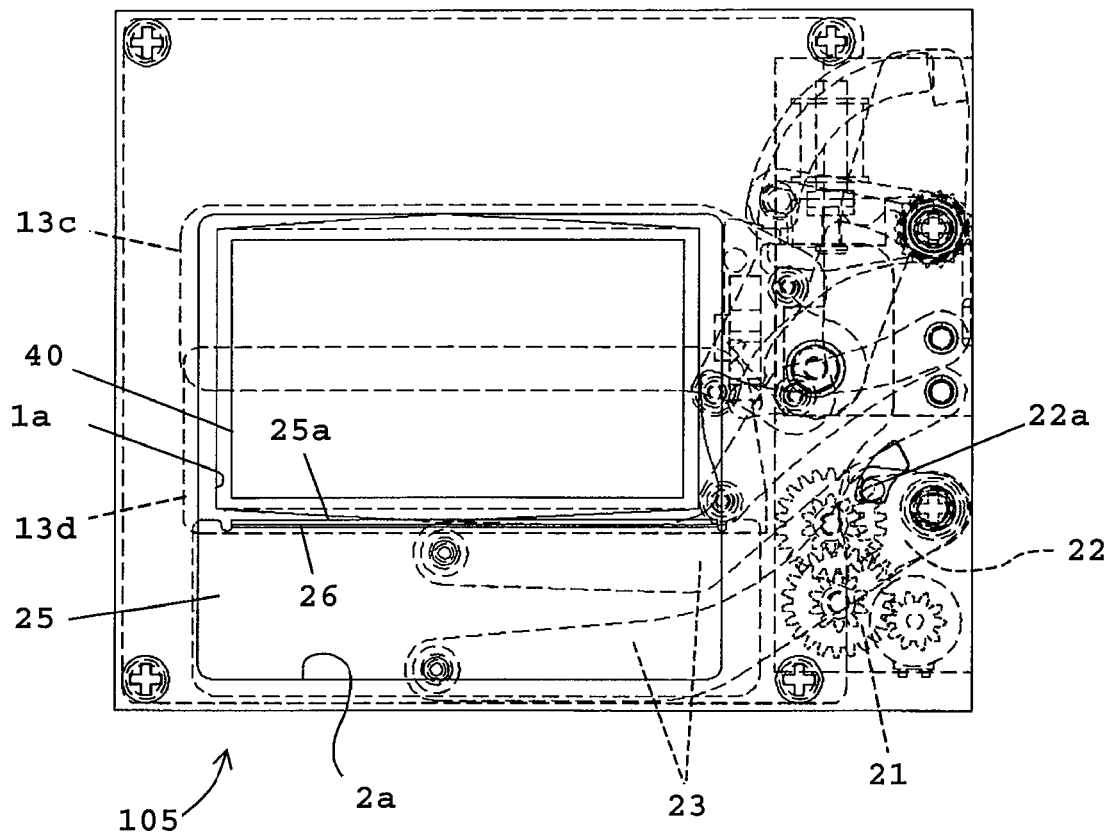
FIG. 4C is a rear view showing the shutter after the completion of the cleaning of the image-pickup element by the cleaning mechanism.

FIGS. 4A to 4C are rear views showing the shutter 105 including the cleaning mechanism from the side of the image-pickup element. The image-pickup element 40 is placed closest to a reader.

FIG. 4A is a rear view showing the shutter 105 in the state shown in FIG. 1. The cleaning brush 26 is placed at the top of the image-pickup element 40. The cleaning brush 26 is adhered and fixed to a bent portion 25a formed at the upper end of the cleaning plate 25. The horizontal length of the cleaning brush 26 is set to be in contact with a frame portion of the image-pickup element 40, which is provided outside the light-receiving surface to allow cleaning of the entire light-receiving surface of the image-pickup element 40.

The ends of the two cleaning-plate arms 23 held rotatably on the cover plate 2 are rotatably coupled to the cleaning plate 25. This provides a parallel link mechanism for translating the cleaning plate 25 in the vertical direction.

When an electric current is applied to the motor 20, the driving force thereof is transmitted to the cleaning lever 22 via the reduction gear 21 to rotate the cleaning lever 22. The rotation range of the cleaning lever 22 is limited by the pin 22a formed on the cleaning lever 22 that contacts both ends of arc-shaped groove holes 2b formed in the cover plate 2.

When the cleaning lever 22 is rotated, the cleaning plate arms 23 coupled thereto are also rotated. As shown in FIGS. 4B and 4C, this moves the cleaning plate 25 and the cleaning brush 26 downward along the light-receiving surface of the image-pickup element 40 while they are held parallel. The cleaning brush 26 is moved in contact with the light-receiving surface of the image-pickup element 40 to sweep away dust adhering to the light-receiving surface. FIG. 4B shows the cleaning brush 26 cleaning an intermediate portion of the light-receiving surface of the image-pickup element 40. FIG. 4C shows the cleaning brush 26 arriving at the lower end of the cleaning range.

As shown in the left side view of FIG. 1, a compression coil spring 24 is placed around the rotation axis of the two cleaning plate arms 23. The biasing force of the compression coil spring 24 acts on the cleaning brush 26 to press it onto the light-receiving surface of the image-pickup element 40 via the cleaning-plate arms 23 and the cleaning plate 25.

The cleaning-plate arms 23 are made of a material such as metal with high stiffness and are coupled to the central portion of the cleaning plate 25. On the other hand, the movements of the left and right ends of the cleaning plate 25 are limited in the optical axis direction by the intermediate plate 3 and the cover plate 2. Thus, the cleaning brush 26 can be brought into contact with the entire light-receiving surface of the image-pickup element 40 with substantially uniform force by the action of the compression coil spring 24.

As shown in FIG. 4C, the lower end of an aperture 2a in the cover plate 2 is below the lower end of the aperture 1a formed in the shutter base plate 1. This prevents the bent portion 25a of the cleaning plate 25 and the cleaning brush 26 protruding from the cover plate 2 toward the image-pickup element from interfering with the cover plate 2.

When the cleaning plate 25 and the cleaning brush 26 are moved downward to the position in FIG. 4C to complete the cleaning, the motor 20 is reversed to return the cleaning plate 25 and the cleaning brush 26 to the position in FIG. 4A.

The abovementioned cleaning operation may be performed in arbitrary timing in response to operation of the user or at turn-on/turn-off of the power of the camera 101. Either of the timings may be selected by the user.

The embodiment has been described for the case where the parallel link translates the cleaning brush 26 in the vertical direction, but a linear guide bar may be used to guide the cleaning plate 25 in a straight line in the vertical direction to translate the cleaning brush 26 in the vertical direction.

The cleaning brush 26 may have a horizontally thin shape as shown or may have a thick shape in which part of the brush is put on the light-receiving surface at the start of cleaning.

While the embodiment has been described in conjunction with the brush used as the cleaning member, another material such as felt and flocked paper may be used.

As described above, in the embodiment, the set lever 4 is moved in the plane orthogonal to the light-receiving surface of the image-pickup element 40 in contrast to the shutter blades 13, the driving lever 6, the blade lever 7, the charge lever 5, and the latching lever 8 that are moved in the plane parallel to the light-receiving surface. In addition, the set lever 4 placed in this manner is also used for driving the main mirror 30. This can provide the compact configuration around the shutter.

It is thus possible to dispose the cleaning mechanism having the cleaning brush 26 provided on the holding member (movable member) that is different from the shutter blades 13, that is, that can be driven independently of the shutter blades 13, without significantly increasing the size of the configuration around the shutter. In other words, the cleaning mechanism can be included in the camera 101 without increasing the size of the camera 101.

In the embodiment, the set lever 4 operating faster than the charge lever 5 is used to release the engagement and holding of the blade lever 7 (shutter blades 13) by the latching lever 8. This can achieve faster open operation of the shutter blades 13 to reduce the release time lag.

The present invention is not limited to these embodiments and various variations and modifications may be made without departing from the scope of the present invention.

Furthermore, the present invention is not limited to these preferred embodiments and various variations and modifications may be made without departing from the scope of the present invention.

This application claims foreign priority benefits based on Japanese Patent Application No. 2007-013129, filed on Jan. 23, 2007, which is hereby incorporated by reference herein in its entirety as if fully set forth herein.

What is claimed is:

1. An image-pickup apparatus comprising:
    a mirror movable into and out of an image pickup optical path;
    shutter blades closing and opening an aperture;
    a blade lever connected with the shutter blades;
    a blade-returning spring biasing the blade lever in an open direction in which the shutter blades open the aperture;
    a driving lever driving the blade lever in a close direction in which the shutter blades close the aperture;
    a blade-driving spring biasing the driving lever in the close direction;
    a latching lever engaging with the blade lever to hold the blade lever at a position where the shutter blades close the aperture; and
    a set lever rotatable between a first position for causing the mirror to be located in the image pickup optical path and a second position for causing the mirror to be located out of the image pickup optical path,
    wherein the set lever rotating from the first position to the second position releases engagement of the latching lever with the blade lever, and
    wherein the blade lever after the engagement is released drives the shutter blades in the open direction by a biasing force of the blade-returning spring.

2. An image-pickup apparatus according to claim 1, further comprising:
    a charge lever,
    wherein the charge lever rotates, when the set lever is rotated from the second position to the first position, the driving lever to charge the blade-driving spring.

3. An image-pickup apparatus according to claim 1, further comprising:
    a cleaning plate provided with a cleaning brush for cleaning a surface of an image-pickup element; and
    a driving mechanism driving the cleaning plate between a state where the cleaning plate is located in the aperture and a state where the cleaning plate is located out of the aperture.

4. An image-pickup apparatus according to claim 2,
    wherein the set lever located at the first position holds the charge lever, and
    wherein the driving lever is held by the charge lever held by the set lever in a charge state where the driving lever has charged the blade-driving spring.

5. An image-pickup apparatus according to claim 3,
    wherein the driving mechanism includes a link mechanism which translates the cleaning plate in the aperture.

6. An image-pickup apparatus according to claim 4, further comprising:
    a charge lever spring biasing the charge lever to the set lever,
    wherein a biasing force of the charge lever spring is set such that an operation in which the set lever rotates from the first position to the second position is performed at a higher speed than that of an operation in which the charge lever releases the holding of the driving lever by the biasing force of the charge lever spring.

7. An image-pickup apparatus according to claim 4, further comprising:
    an electromagnet holding the driving lever in the charge state,
    wherein the electromagnet to which an electric current is applied holds the driving lever in the charge state even if the holding of the driving lever by the charge lever is released.

8. An image-pickup apparatus according to claim 7,
    wherein, after the holding of the driving lever by the charge lever is released, cutting the electric current applied to the electromagnet causes the biasing force of the blade-returning spring to rotate the driving lever together with the blade lever in the close direction.

* * * * *